(12) United States Patent
Gerum

(10) Patent No.: US 6,301,548 B1
(45) Date of Patent: Oct. 9, 2001

(54) METHOD AND DEVICE FOR DETERMINING THE WHEEL BASE OF VEHICLES

(75) Inventor: Eduard Gerum, Rosenheim (DE)

(73) Assignee: Knorr-Bremse fur Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/262,862

(22) Filed: Mar. 5, 1999

(30) Foreign Application Priority Data

Mar. 5, 1998 (DE) .............................................. 198 09 546

(51) Int. Cl.$^7$ ...................................................... G01B 7/14
(52) U.S. Cl. ............................................................ 702/158
(58) Field of Search .................................. 702/158, 165, 702/145, 146, 147–149, 33, 36, 113–115, 142, 150, 151–152, 155, 157, 163, 182–184; 701/37, 41–43, 70, 74, 29, 36, 93; 73/65.05, 862.57, 65.06; 180/197, 24.01, 403, 408, 411, 422; 250/432, 426; 303/140

(56) References Cited

U.S. PATENT DOCUMENTS

| | | | |
|---|---|---|---|
| 5,139,103 | * 8/1992 | Ducote | 180/24.01 |
| 5,152,544 | * 10/1992 | Dierker, Jr. et al. | 280/432 |
| 5,232,238 | * 8/1993 | Ducote | 280/426 |
| 5,388,658 | * 2/1995 | Ando et al. | 180/197 |
| 5,477,739 | 12/1995 | Holler et al. | 73/862.56 |
| 5,519,615 | * 5/1996 | Schöb et al. | 701/70 |
| 5,696,677 | * 12/1997 | Leaphart et al. | 701/37 |
| 5,996,722 | * 12/1999 | Price | 180/430 |
| 6,015,192 | * 1/2000 | Fukumura | 303/104 |

FOREIGN PATENT DOCUMENTS

| | | |
|---|---|---|
| 3210318 | 9/1983 | (DE) . |
| 4008167 | 9/1991 | (DE) . |
| 4313198C2 | 10/1994 | (DE) . |
| 19706752 | 8/1997 | (DE) . |

* cited by examiner

*Primary Examiner*—Patrick Assouad
*Assistant Examiner*—Khoi Duong
(74) *Attorney, Agent, or Firm*—Barnes & Thornburg

(57) ABSTRACT

A method for determining the wheel base of steerable vehicles when cornering, in which the wheel base is determined from at least one defined track width, measured wheel circumference speeds and/or measured steering angles.

14 Claims, 10 Drawing Sheets

METHOD AND DEVICE FOR DETERMINING THE WHEEL BASE OF VEHICLES

BACKGROUND AND SUMMARY OF THE INVENTION

The invention relates to a method for the automatic determination of the wheel base of steerable vehicles, particularly road vehicles, as well as to a device.

The handling of vehicles during braking operations could be improved considerably by the use of electronic automatic control systems. For achieving optimal braking decelerations, it is required, particularly in the case of trucks, to distribute a braking force, defined by the driver by the brake pedal, according to the momentary axle load to the individual wheels of the front and rear axle. This is achieved by the use of ALB devices (automatic load-dependent brake-force distribution devices) or, when EBS systems (electronic brake control systems) are used, by the use of load sensors. It is also endeavored in the case of tractor-trailer units to distribute the braking force defined by the driver optimally to the tractor vehicle and to the trailer vehicle in order to minimize the coupling forces, that is, the pulling and running-up forces acting between the two vehicles. A process for determining the running-up forces exerted by the trailer vehicle on the tractor vehicle is known from German Patent Document DE 43 13 198 C2. Corresponding to U.S. Pat. No. 5,477,739, in the case of this process, the distances of the two axles from the center of gravity of the tractor vehicle are calculated in the non-accelerated vehicle connection from the measured axle loads and a given wheel base of the tractor vehicle. The wheel base of the tractor vehicle is the distance between its front and rear axle. In order to further improve the handling of vehicles, the dynamic distribution of the axle loads—that is, the axle load distribution in the case of a braked or accelerated vehicle—can additionally be taken into account. If this is to take place in a computerized manner, for example, by using a microprocessor and calculating the dynamic axle load distribution from a measured static axle load distribution and a momentary vehicle deceleration, the knowledge of the wheel base is required also for this purpose.

A method and a device, for example, a computer system with integrated software, would therefore be desirable which automatically determines the wheel base of a vehicle. For economic reasons, it would also be desirable for the method and the device to be suitable for determining the wheel base of different vehicles or of different vehicle types.

It is therefore an object of the invention to provide a method and a device by which the wheel base of vehicles can be determined automatically.

The invention is based on the recognition that the wheel base of a steerable vehicle can be determined during stable cornering by means of the possibly different track widths of individual vehicle axles, the wheel circumference speeds and/or by means of steering angles of the steerable vehicle wheels. In this case, stable cornering is a cornering during which all wheels of the vehicle roll as precisely as possible on the road; that is, during which only low longitudinal and lateral slip values and low traction and braking values occur at the wheels.

The wheel base of a vehicle can therefore be determined exclusively from measured wheel circumference speeds and/or measured steering angles as well as defined track widths which may differ according to the vehicle. The track width is the mean distance between the "right" and the "left" wheel or twin wheel of a vehicle axle. For determining the wheel base according to the invention, the possibly different track widths of the individual vehicle axles are defined which, in the case of many trucks, have approximately the same value and can therefore be used as a constant for many cases.

The determination of the wheel circumference speeds can be carried out by rotational wheel speed sensors which exist already in vehicles equipped with an antilock system. Thus, the dererrmination of the base wheel base is possible merely using of sensors which exist already in modern vehicles. According to the vehicle type (tractor vehicle, trailer vehicle, semitrailer, etc.), a certain minimum number of wheel speed sensors is required for determining the wheel base.

If the vehicle is equipped with rotational wheel speed sensors on more wheels than required for determining the wheel base, a "redundant" wheel base computing is conceivable, using different "sensor groups", so that the obtained results can be compared.

If a vehicle is equipped with steering angle sensors on its steerable wheels, this may be used either exclusively or in combination with the rotational wheel speed sensors and the track width for determining the wheel base.

A wheel base determined by the method according to the invention and a signal representing the wheel base which is determined by the device according to the invention can be supplied to other control or automatic control devices, such as an automatic driving dynamics control, an antilock system, an electronic braking control system, etc., for further processing.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
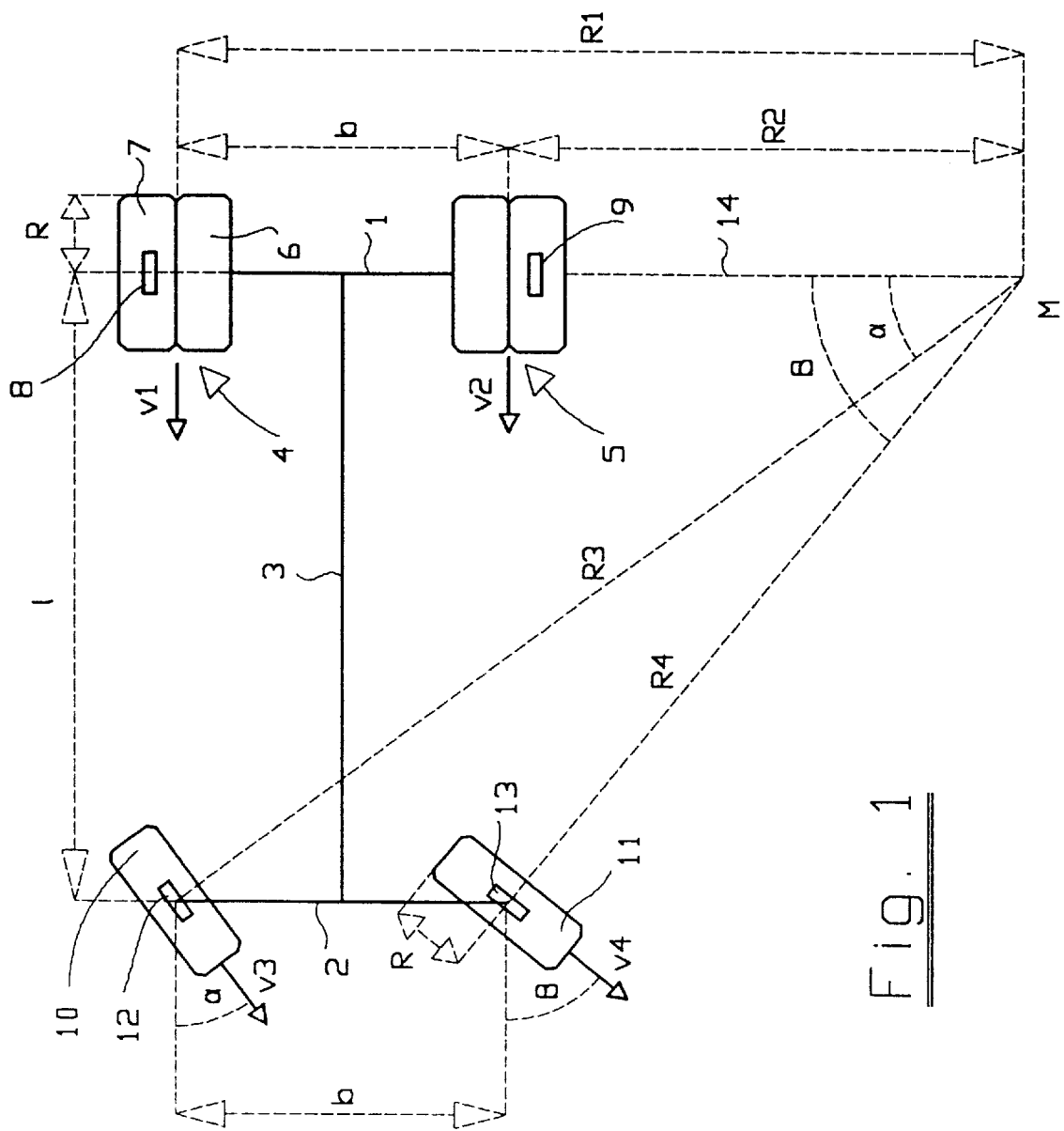
FIG. 1 is a top view of a schematically outlined chassis of a vehicle which is equipped with four rotational wheel speed sensors.

FIG. 1 is a schematic view of the chassis of a vehicle. The chassis has a first axle 1 which in the following will be called a rear axle; a second axle 2 which in the following will be called a front axle; and a side member 3 connecting the two axles in the longitudinal direction of the vehicle. The side member 3 has a length l which corresponds to the distance between the front and the rear axle. In the following, this distance l will be called the wheel base, which is to be determined.

Two twin wheels 4 and 5, which in the following will be called rear wheels, are arranged on the rear axle 1, which rear wheels consist of respective mutually connected individual wheels 6 and 7. The rear wheels 4 and 5 are not steerable so that the rear axle 1 corresponds to their joint axis of rotation. A rotational wheel speed sensor 8 and 9 is assigned to each of the rear wheels 4 and 5. The wheel circumference speeds v1 and v2 of the rear wheels 4 and 5 are determined from the determined rotational wheel speeds and a wheel radius R which in the following computations is assumed to be constant. The rear wheels 4 and 5 have a mean axial distance b which in the following will be called the track width.

Two steerable front wheels 10 and 11 are arranged on the front axle 2. A rotational wheel speed sensor 12 and 13 is also assigned to each of these front wheels 10 and 11. Analogous to the rear axle 1, using the rotational wheel speed sensors 12 and 13, the wheel circumference speeds v3 and v4 of the front wheels 10 and 11 can be determined from the rotational wheel speeds and the wheel radius. The distance between the centers of the two front wheels 10 and 11, that is, the track width b of the front axle 1, is equal to the track width b of the rear axle 1 in the embodiment shown here. In addition, in the embodiment shown here, the radius R of the front wheels 10 and 11 is equal to that of the rear wheels 4 and 5 and is also assumed to remain constant in all driving situations.

When the vehicle is driving straight ahead, all wheels are aligned in parallel and, because of the identical wheel diameters, the wheel circumference speeds v1, v2, v3 and v4 are also the same. In contrast thereto, in FIG. 1, the two front wheels 10 and 11 are turned to the left corresponding to a left cornering so that four different values are obtained for the wheel circumference speeds v1, v2, v3 and v4.

Assuming, as mentioned above, that only low longitudinal and lateral slip values and low traction and braking forces occur at the individual wheels of the vehicle, an instantaneous center M is assigned to the vehicle during cornering. The instantaneous center M is a fictitious space point about which all points of the chassis—particularly the centers of the individual wheels 4, 5, 10 and 11—rotate. It is obvious that the instantaneous center M of a vehicle with non-steerable rear wheels 4 and 5 is always situated on an extention 14 of the rear axle 1. When the vehicle is driving straight ahead, the instantaneous center M is situated in the infinite, while during cornering—depending on the cornering radius—a certain distance is obtained to the individual wheels 4, 5, 10 and 11. If the two speeds v1 and v2 of the rear wheels 4 and 5 as well as the track width b are known, the instantaneous center M can be determined by using the equation $$\frac{V_1}{V_2} = \frac{R_1}{R_2};$$

The connection lines of the instantaneous center M with the centers of the front wheels 10 and 11 will be called distances R3 and R4 in the following. Using the following two equations $$\frac{V_1}{V_3} = \frac{R_1}{R_3} - \cos\alpha = \frac{V_1}{V_3} = \alpha$$

$$\frac{V_2}{V_4} = \frac{R_4}{R_4} - \cos\beta = \frac{V_2}{V_4} = \beta$$

the steering angle α of the right front wheel 10 can be determined from the ratio of the wheel circumference speeds v1 and v3. Analogously thereto, the steering angle β of the left front wheel 11 can be determined from the ratio of the two speeds v2 and v4. In this case, the steering angle is the angle α and β between the turned front wheel 10 and 11 and its position when driving straight ahead. For determining the wheel base l, the following equations can be established for the quantities α, β, R2 and b:

$$\tan\alpha = \frac{l}{R_1} - \tan\alpha = \frac{l}{R_2 + b};$$

$$R_2 = \frac{l}{\tan\beta};$$

By transformation, the wheel base l can be determined therefrom as a function of the track width b and of the steering angles α and β of the front wheels 10 and 11.

$$l = b\,\frac{\tan\alpha \cdot \tan\beta}{\tan\beta - \tan\alpha}$$

By trigonometric transformations by means of the equations $$\tan\alpha = \frac{\sqrt{1-\cos^2\alpha}}{\cos\alpha}; \tan\beta = \frac{\sqrt{1-\cos^2}}{\cos\beta}$$

the steering angles α and β can be replaced so that, after further transformations, an equation for the wheel base l is obtained which contains as parameters only the track width b and ratios of measured wheel circumference speeds:

$$l = b\,\frac{\sqrt{1-\left(\frac{V_1}{V_2}\right)^2}\sqrt{1-\left(\frac{V_2}{V_4}\right)^2}}{\frac{V_1}{V_2}\frac{V_2}{V_4}\left(\frac{\sqrt{1-\left(\frac{V_2}{V_4}\right)^2}}{\frac{V_2}{V_4}}\frac{\sqrt{1-\left(\frac{V_1}{V_3}\right)^2}}{\frac{V_1}{V_3}}\right)}$$

$$l = b\,\frac{\sqrt{1-\left(\frac{V_1}{V_3}\right)^2}\sqrt{1-\left(\frac{V_2}{V_4}\right)^2}}{\frac{V_1}{V_3}\sqrt{1-\left(\frac{V_2}{V_4}\right)^2} - \frac{V_2}{V_4}\sqrt{1-\left(\frac{V_1}{V_3}\right)^2}}$$

By means of this equation, it is shown that, when the track width b is defined, the wheel base l can be determined precisely when the denominator of the term on the right equation side is not equal to 0. This occurs when the vehicle is cornering, that is, when the two steering angles α and β have different values, that is, when tanβ—tanα are not equal to zero. The narrower the curve, the larger the respective steering angles α and β and the more precisely the wheel base l can be determined as a function of the wheel circumference speeds v1, v2, v3 and v4, which can be determined with certain measuring tolerances.

Figure 2:
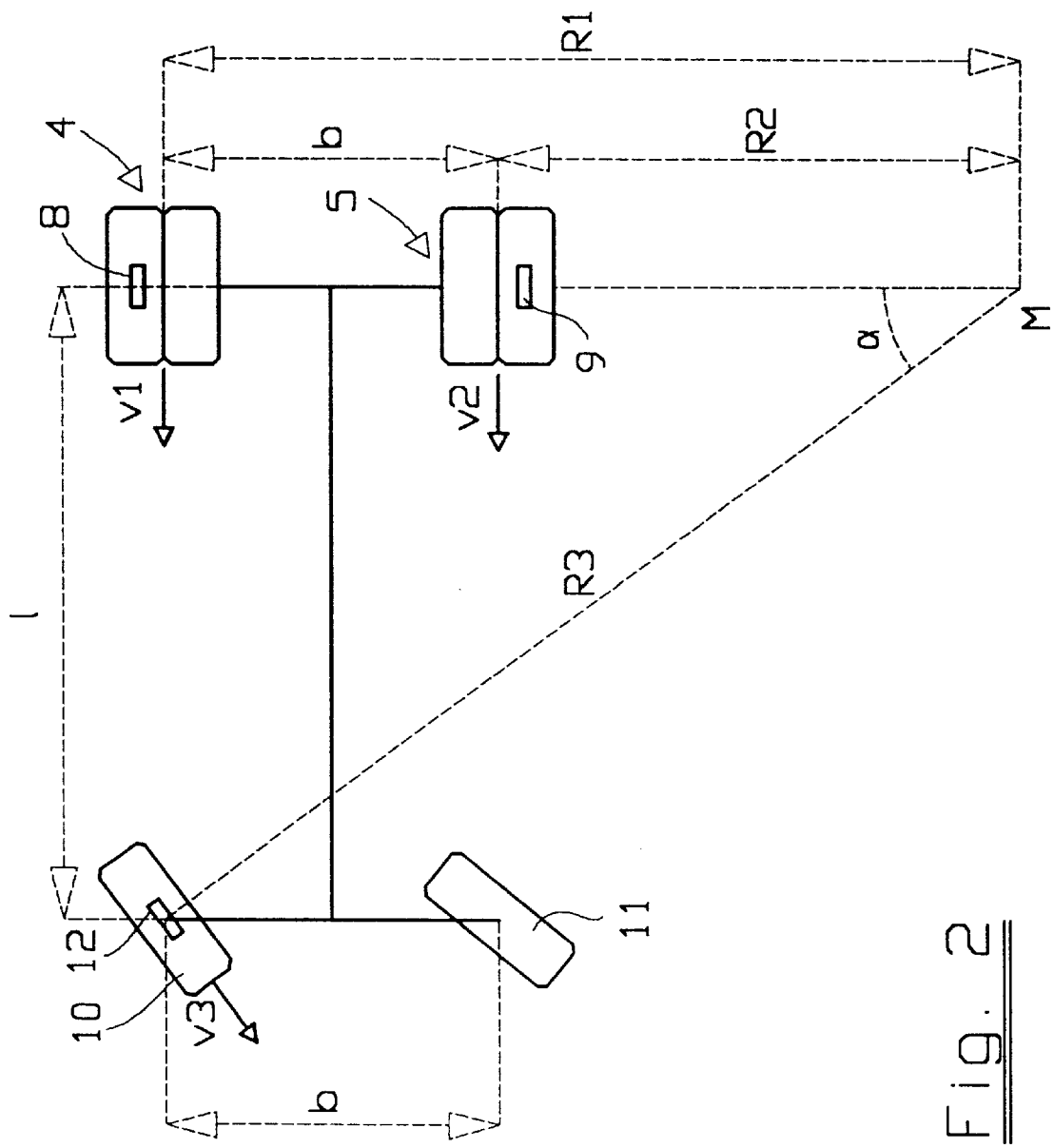
FIG. 2 is a view of the vehicle of FIG. 1, in which only three rotational wheel speed sensors are used for determining the wheel base.

By means of FIG. 2, it will now be explained how the wheel base of the vehicle illustrated in FIG. 1 can be determined by using only three rotational wheel speed sensors. For this purpose, only the wheel circumference speeds v1 and v2 furnished by the two wheel sensors 8 and 9 of the non-steered rear wheels 4 and 5 and the wheel circumference speed v3 furnished by the rotational wheel speed sensor 12 of the right front wheel 10—that is, of the front wheel which is on the outside when cornering—are used. Analogously to the computing operation with four sensors described in FIG. 1, the following two equations can be established for the distances R2 and R3 of the wheel centers from the instantaneous center M.

$$\frac{R_2}{R_3} = \frac{V_2}{V_3};$$

$$\frac{V_1}{V_2} = \frac{R_2 + b}{R_2} \Rightarrow R_2 = b \frac{V_2}{V_1 - V_2} \Rightarrow R_2 = b \frac{V_3}{V_1 - V_2};$$

In addition, from the vehicle geometry, the following equation can be established for the distances R2, R3, the track width b and the wheel base l to be determined:

$$R_3^2 = (R_2 + b)^2 + l^2;$$

The unknowns R2 and R3 contained in these three equations are eliminated by transforming and the following equation is derived therefrom for the wheel base l.

$$l = b \frac{\sqrt{V_3^2 - V_1^2}}{(V_1 - V_2)^2};$$

Thus, the wheel base l can be determined merely from the track width b, the two wheel circumference speeds v1 and v2 of the rear wheels 4 and 5 as well as the speed v3 of the steered front wheel 10—which here is on the outside during the cornering.

As an alternative thereto, by establishing similar equations, the wheel base l can also be computed from the two rear wheel speeds v1 and v2 and a speed v4 of the front wheel 11 which is on the inside during the cornering, the following equation being obtained for the wheel base l:

$$l = b \frac{\sqrt{V_4^2 - V_1^2}}{(V_1 - V_2)^2};$$

It is therefore possible to compute the wheel base of a vehicle, which is equipped with four rotational wheel speed sensors 8, 9, 12 and 13 (FIG. 1), in two different manners. If it is assumed that the measured wheel circumference speeds v1, v2, v3 and v4 are subjected to certain measuring tolerances, the use of both processes allows a comparison of the obtained results and supplies information concerning the precision of the determined wheel base l.

Figure 3:
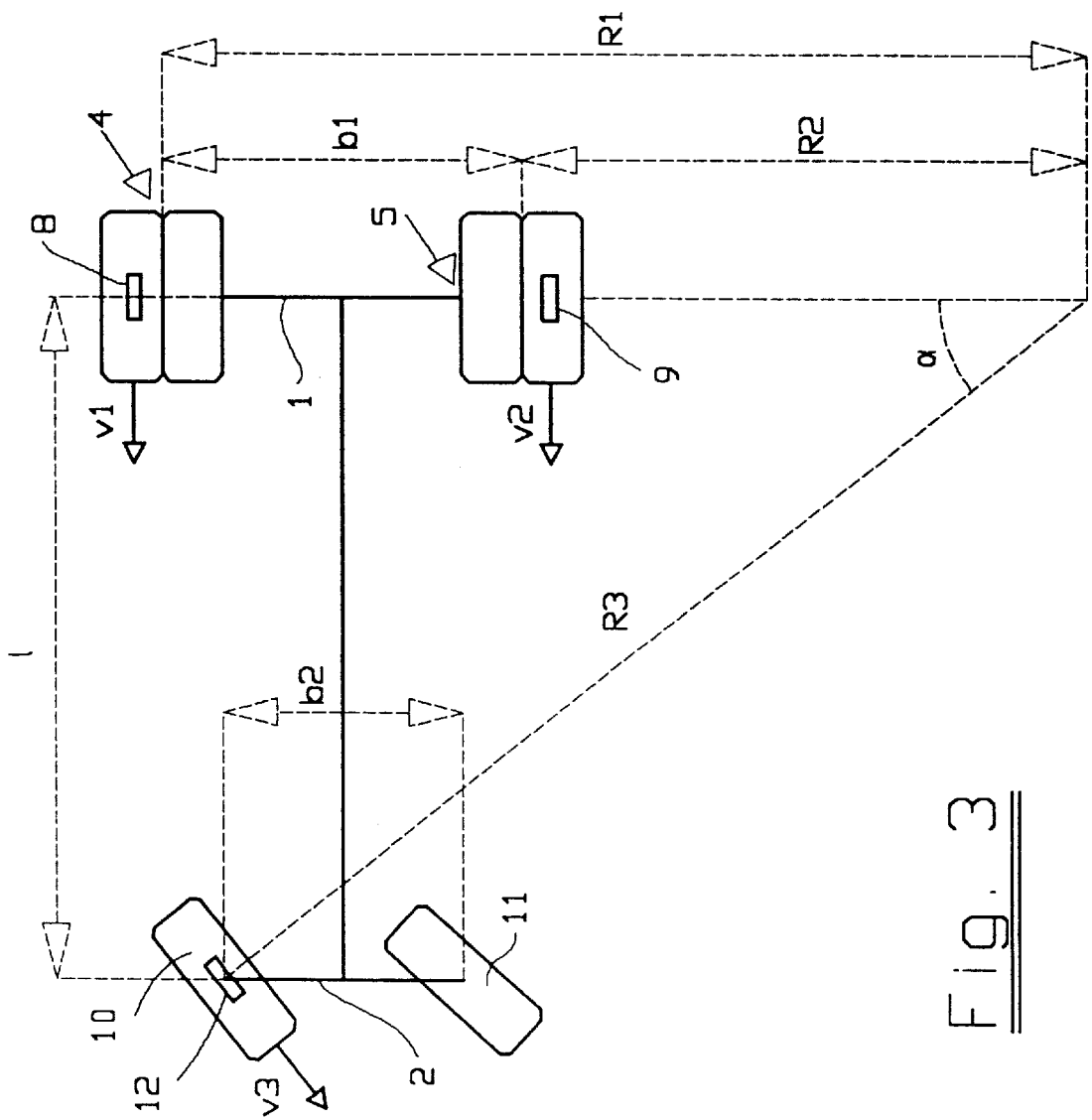
FIG. 3 is a schematic top view of a vehicle with different track widths.

By means of FIG. 3, a process is described for determining the wheel base of a vehicle having different track widths at the front and the rear axle. The center track width of the rear axle 1 of the vehicle and b1 and is larger here than the center track width b2 at the front axle 2. Similarly to the description in connection with FIG. 2, merely the wheel circumference speeds v1 and v2 furnished by the two rotational wheel speed sensors 8 and 9 of the non-steered rear wheels 4 and 5 as well as the wheel circumferential speed v3 furnished by the rotational wheel speed sensor 12 of the front wheel 10 are used for the calculation of the wheel base l. The unknowns R2 and R3 contained in the following three equations are eliminated and the equation system is resolved according to the wheel base l:

$$\frac{V_1}{V_2} = \frac{R_2 + b_1}{R_2} \Rightarrow R_2 = \frac{V_2}{V_1 - V_2} b_1$$

$$\frac{V_2}{V_3} = \frac{R_2}{R_3} \Rightarrow R_3 = \frac{V_3}{V_1 - V_2} b_1;$$

$$\left(R_2 + \frac{b_1 + b_2}{2}\right)^2 + l^2 = R_3^2$$

The resulting wheel base l $$l = \sqrt{\left(\frac{V_3}{V_1 - V_2} b_1\right)^3 - \left(\frac{V_2}{V_1 - V_2} b_1 + \frac{b_1 + b_2}{2}\right)^2}$$

can therefore be calculated from the speeds v1, v2 and v3 as well the two track widths b1 and b2.

As an alternative, it is also possible to use the rotational wheel speed sensor (not shown) of the other front wheel 11, that is, the front which is on the inside during the cornering, for determining the wheel base l, for which analogously the following can be derived.

$$l = \sqrt{\left(\frac{V_4}{V_1 - V_2} b_1\right)^3 - \left(\frac{V_2}{V_1 - V_2} b_1 + \frac{b_1 - b_2}{2}\right)^2}$$

Thus, also for the case of different track widths b1, b2, a redundant wheel base computation is possible.

Figure 4:
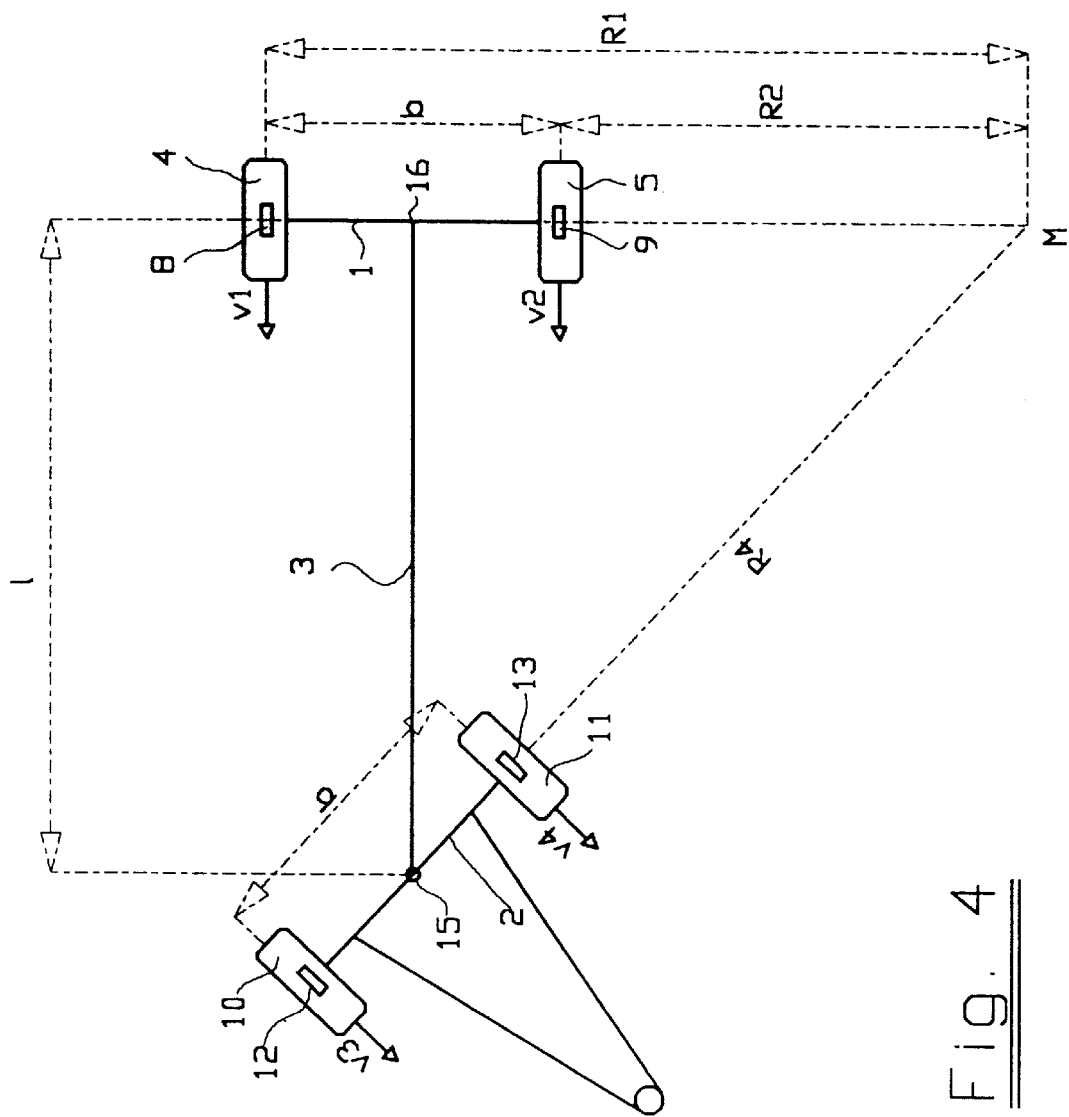
FIG. 4 is a view of a trailer vehicle equipped with four rotational wheel speed sensors.

By means of FIG. 4, the determination of the wheel base of a two-axle trailer vehicle is explained. The rear wheels 4 and 5 are rotatably arranged on the rigid rear axle 1 and have the track width b. Correspondingly, the front wheels 10 and 11 are rotatably arranged on the front axle 2 and have the same track width b. With respect to the front axle 2, the front wheels 10 and 11 are non-steerable, but the whole front axle 2 is connected by a swivel joint 15 with the side member 3 and is therefore steerable. In the illustrated position, the front axle 2 of the trailer vehicle is turned "to the left". A rotational wheel speed sensor 8, 9, 12 and 13 is assigned to each of the four wheels 4, 5, 10 and 11 of the trailer vehicle, by means of which sensor the wheel circumference speeds v1, v2, v3 and v4 can be determined. For the four wheel circumference speeds and the distances of the wheel centers from the instantaneous centers M of the vehicle, the following equations can be derived:

$$\frac{V_2}{V_4} = \frac{R_2}{R_4};$$

$$\frac{V_1}{V_3} = \frac{R_2 + b}{R_4 + b};$$

$$R_4 = \frac{V_4(V_3 - V_1)}{V_1 V_4 - V_2 V_3} b;$$

$$R_2 = \frac{V_2(V_3 - V_1)}{V_1 V_4 - V_2 V_3} b$$

An equation for the wheel base l can be derived from the distances of the swivel joint 15 and of the rear axle centers 16 from the instantaneous center M of the trailer vehicle:

$$1^2 + \left(R_2 + \frac{b}{2}\right)^2 = \left(R_4 + \frac{b}{2}\right)^2$$

By eliminating the unknowns R2 and R4, finally the wheel base 1 of the trailer vehicle can be determined as a function of the track width b and the speeds v1, v2, v3 and v4.

$$l = b\sqrt{\left(\frac{V_4(V_3 - V_1)}{V_1V_4 - V_2V_3} + \frac{1}{2}\right)^2 - \left(\frac{V_2(V_3 - V_1)}{V_1V_4 - V_2V_3} + \frac{1}{2}\right)^2}$$

Figure 5:
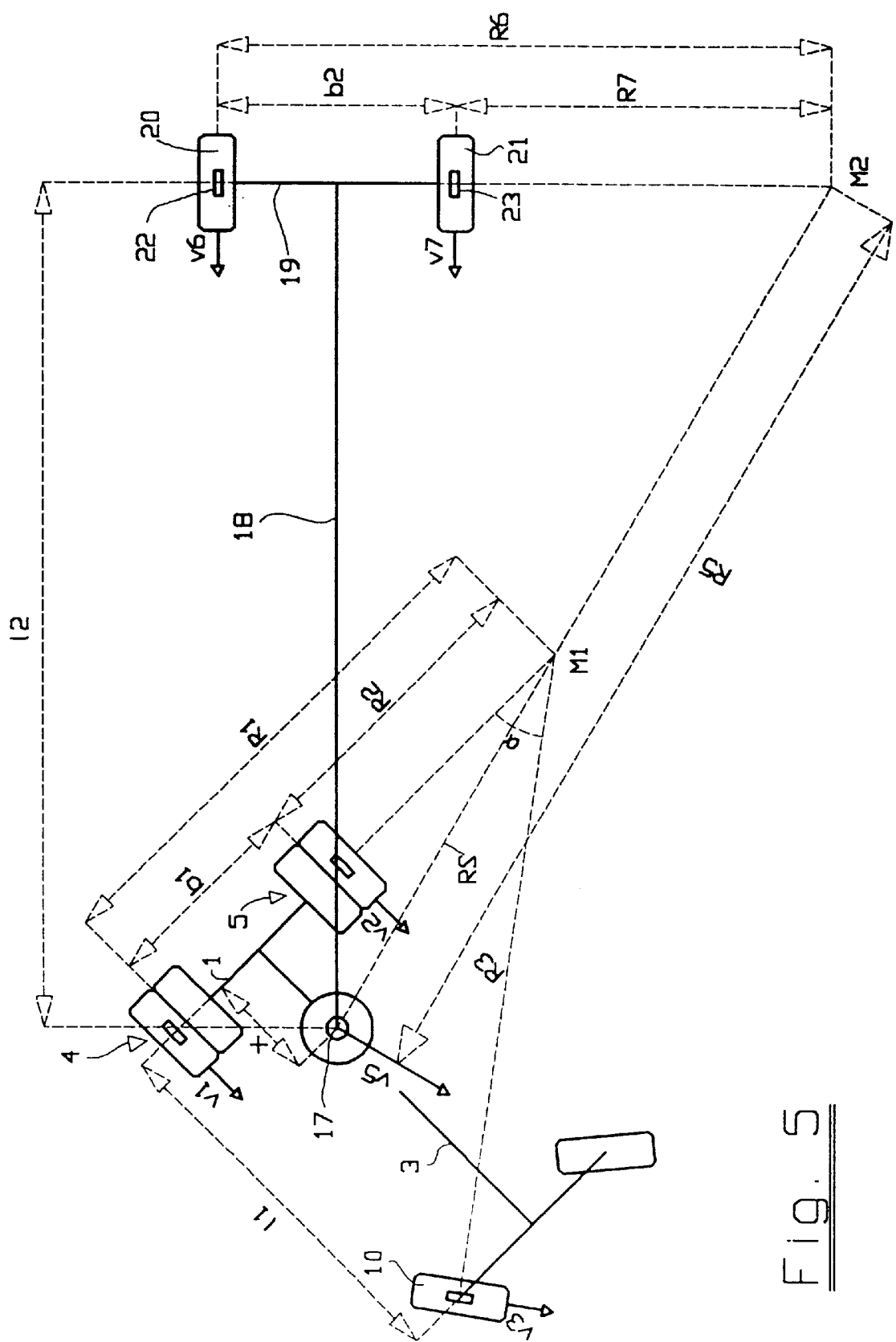
FIG. 5 is a schematic top view of a semitrailer unit.

By means of FIG. 5, the wheel base determination for a semitrailer is described, the chassis of a tractor vehicle also being schematically outlined. The tractor vehicle has a wheel base A1 which, for example, as described in connection with FIG. 2, can be determined from the wheel circumference speeds v1, v2 and v3 of the rear wheels 4 and 5 and of the front wheel 10 of the tractor vehicle.

At a distance x from the rear axle 1 of the tractor vehicle, a fifth wheel articulation 17 for coupling the semitrailer is provided on the side member 3 of the tractor vehicle. From the position of the instantaneous center M1 of the tractor vehicle, which can be determined from the speeds v1 and v2 and from the distance R5 of the fifth wheel articulation 17 from the instantaneous center M1, the speed v5 of the fifth wheel articulation 17 can be computed by the following equations:

$$\frac{V_1}{V_2} = \frac{R_2 + b_1}{R_2} \Rightarrow R_2 = b_1 \frac{V_2}{V_1 - V_2};$$

$$\frac{V_5}{\frac{1}{2}(V_1 + V_2)} = \frac{R_2 + \frac{b_1}{2}}{\sqrt{\left(R_2 + \frac{b_1}{2}\right)^2 + x^2}};$$

By substitution and resolving according to v5, the following is obtained:

$$V_5 = \frac{1}{2}(V_1 + V_2)b_1 \frac{\frac{V_2}{V_1 - V_2} + \frac{1}{2}}{\sqrt{b_1^2\left(\frac{V_2}{V_1 - V_2} + \frac{1}{2}\right)^2 + X^2}}$$

A side member 18 of the semitrailer is coupled to the fifth wheel articulation 17 and is connected with a rear axle 19. The side member 18 has the length l2 which corresponds to the "wheel base" of the semitrailer, that is, the distance of the fifth wheel articulation 17 from the rear axle 19. At the rear axle 19, two non-steerable wheels 20 and 21 are arranged to which rotational wheel speed sensors 22 and 23 are assigned. The wheels 20 and 21 have a mean spacing b2, which corresponds to the track width b2 of the semitrailer. From the track width b2 and the speeds v7 of the wheels 20 and 21 of the semitrailer, its instantaneous center M2 can be determined. As an alternative, the instantaneous center M2 of the semitrailer is also obtained at the intersection point of the extension of the distance R5 and of the rear axle 19 of the semitrailer.

From the speeds v5, v6 and v7 and the track width b2 of the semitrailer, the distances R7 of the wheel 21 and R5 of the fifth wheel articulation 17 from the instantaneous center M2 can be determined by the following equations.

$$\frac{V_6}{V_7} = \frac{R_6}{R_7} \Rightarrow \frac{V_6}{V_7} = \frac{R_7 + b_2}{R_7} \Rightarrow R_7 = \frac{V_7 b_2}{V_6 - V_7};$$

$$\frac{V_5}{V_7} = \frac{R_5}{R_7} \Rightarrow R_5 = \frac{V_5 b_2}{V_6 - V_7};$$

In addition, the "wheel base", which in the case of a semitrailer corresponds to the length l2, can be computed by the following equation:

$$\left(R_7 + \frac{b_2}{2}\right)^2 + l_2^2 = R_5^2;$$

By eliminating the unknowns R5 and R7, the wheel base or the length l2 of the semitrailer can be determined as a function of its track width b2, the speed v5 of the fifth wheel articulation 17 and the speeds v6 and v7 of the wheels 20 and 21.

$$l_2 = b\sqrt{\left(\frac{V_5}{V_6 - V_7}\right)^2 - \left(\frac{V_7}{V_6 - V_7} + \frac{1}{2}\right)^2};$$

Figure 6:
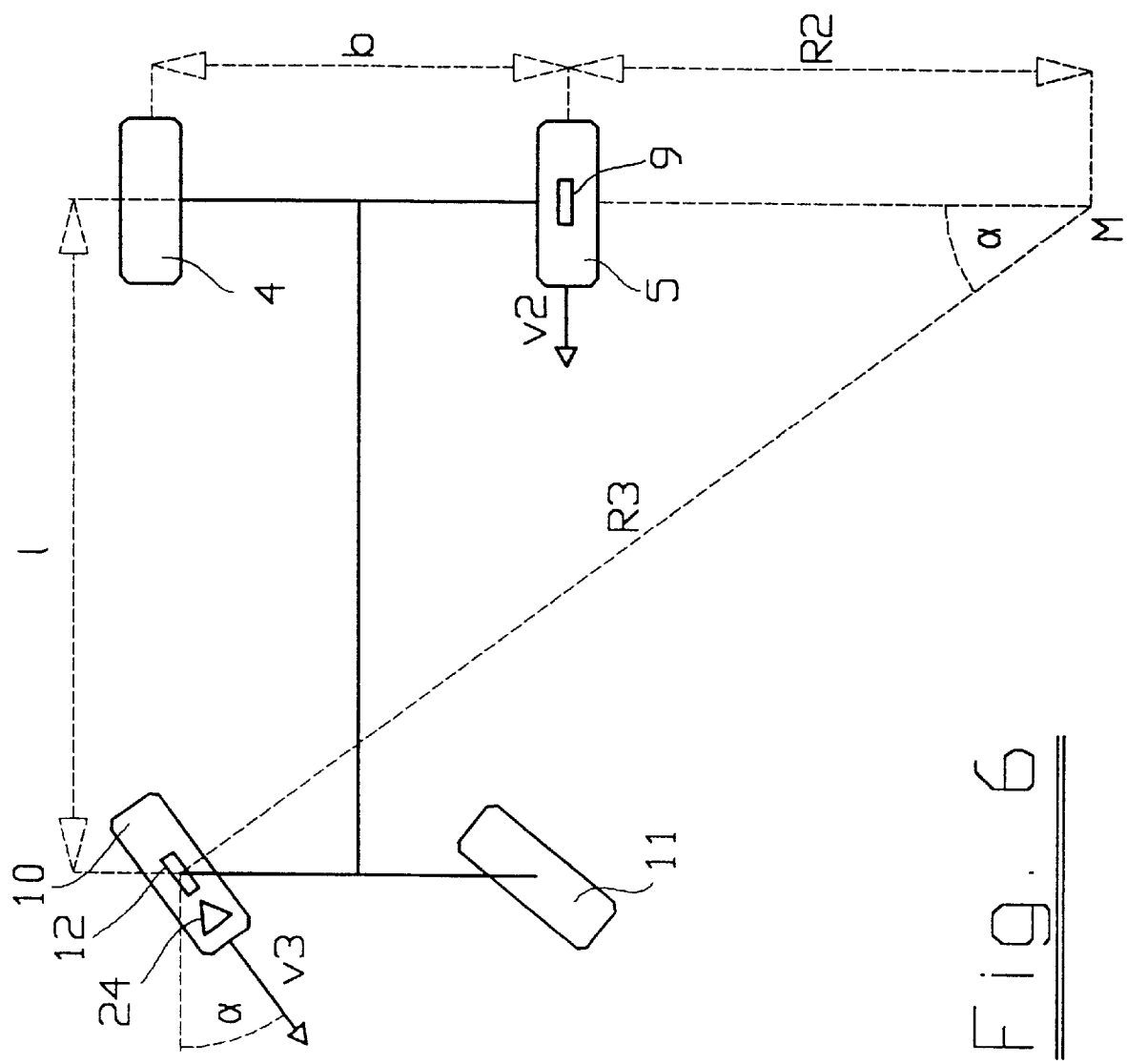
FIG. 6 is a schematic top view of a vehicle equipped with two rotational wheel speed sensors and a steering angle sensor.

By means of FIG. 6, it is described how the wheel base 1 of a vehicle can be determined from the measured speed v2 of a non-steered wheel, the measured speed v3 of a steered wheel and a steering angle α of a steered wheel. In the embodiment shown here, the non-steered wheel is the left rear wheel 5 and the steered wheel is the right front wheel 10, to which the rotational wheel speed sensors 9 and 12 are assigned. For determining the steering angle α, an additional steering angle sensor 24 is provided on the front wheel 10, which steering angle sensor 24 is schematically outlined by a triangle. By means of the following two equations, the distances R2 and R3 of the wheel centers from the instantaneous center M of the vehicle can be computed from the measured speeds v2 and v3 of the wheels 5 and 10 and the steering angle α.

$$R_3 = \frac{l}{\sin\alpha}$$

$$\frac{R_2}{R_3} = \frac{V_2}{V_3};$$

In addition, the wheel base 1 is linked with the distances R2 and R3 as well as the track width b of the vehicle by the following equation:

$$R_3^2 = (R_2 + b)^2 + l^2;$$

This results in the following square equation, from which the wheel base 1 can be determined as a function of the measured speeds v2 and v3 as well as the measured steering angle α.

$$\left[\frac{1}{\sin^2\alpha}\left(\frac{V_2}{V_3} - 1\right) + 1\right] + l \frac{2}{\sin\alpha} \frac{V_2}{V_3} b + b^2 = 0$$

As an alternative, it would also be possible to mount both rotational wheel speed sensors on the rear wheels 4 and 5 and to mount only the steering angle sensor 24 on the front wheel 10. In addition, it is possible to mount the steering angle sensor 24 and/o the rotational wheel speed sensor 12 on the left front wheel. Similar equations are obtained for all cases which, however, are not explicitly indicated.

Figure 7:
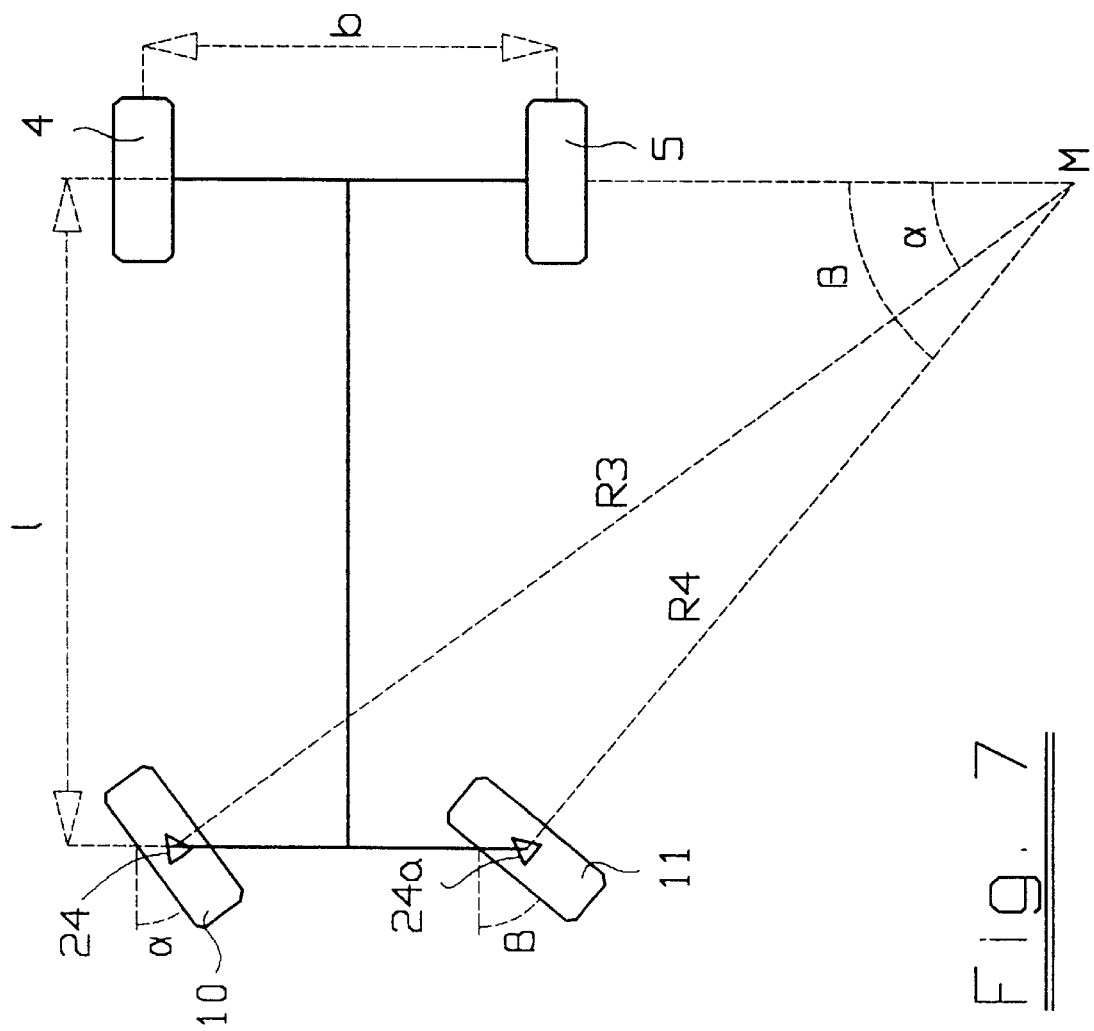
FIG. 7 is a view of a vehicle equipped with two steering angle sensors.

As alternative, FIG. 7 describes how the wheel base 1 of a vehicle can be determined as a function of its track width b merely from the steering angles α and β of two steered wheels 10 and 11. For determining the wheel base l, in addition to the steering angle sensor 24 of the wheel 10, a steering angle sensor 25 is provided on the steerable wheel 11 by means of which the steering angle β can be determined. From the required wheel base l, the spacings of the centers of the wheels 10 and 11, which are called R3 and R4, can be represented by the following equations:

$$R_3 = \frac{l}{\sin\alpha}$$

$$R_4 = \frac{l}{\sin\beta}$$

In addition, the track width b, the spacings R3 and R4 as well as the steering angles α and β are linked by the following equation:

$$b^2 = R_3^2 + R_4^2 - 2R_3R_4 \cos(\alpha-\beta);$$

By substitution, this results in the following required wheel base l:

$$l = \frac{b}{\sqrt{\frac{1}{\sin^2\alpha} + \frac{1}{\sin^2\beta} - \frac{2\cos(\alpha-\beta)}{\sin\alpha\sin\beta}}}$$

Figure 8:
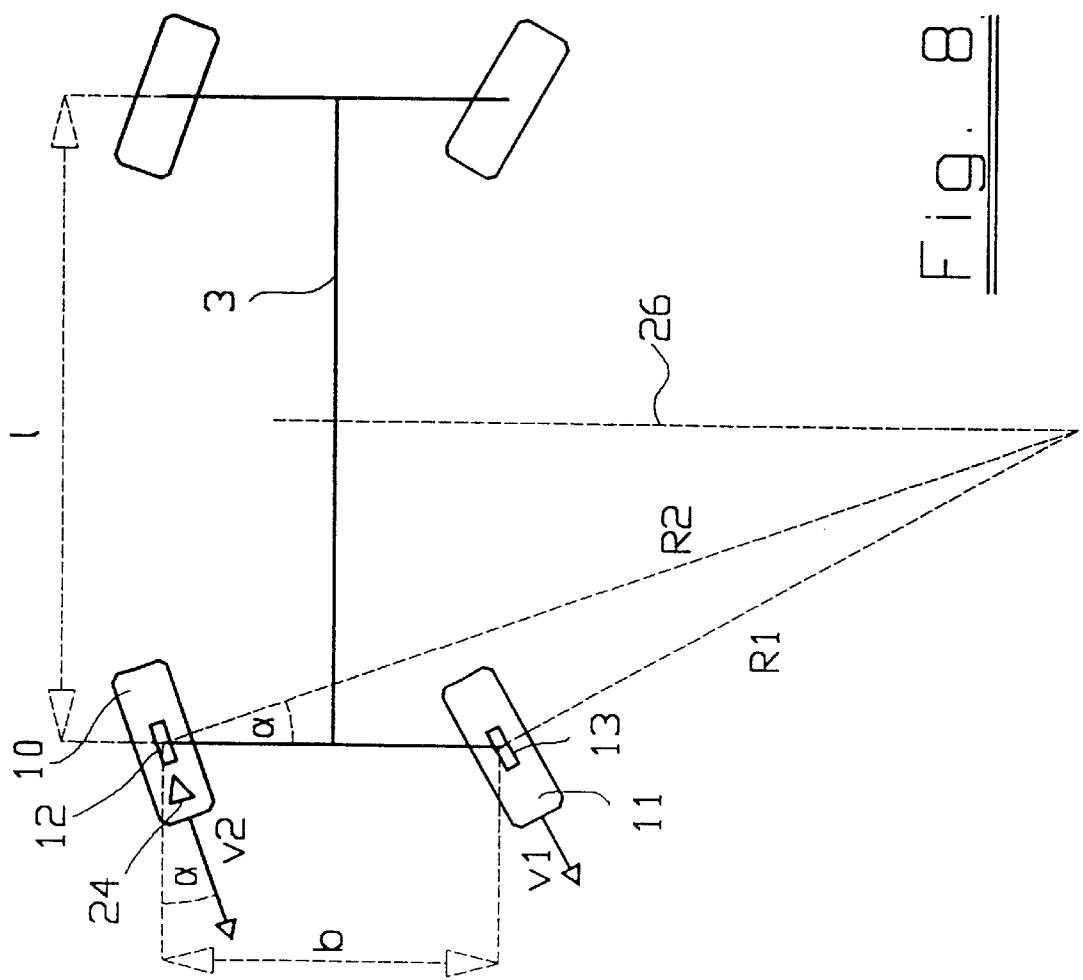
FIG. 8 is a view of a vehicle which is equipped with two rotational wheel speed sensors and one steering angle sensor and has a symmetrical all-wheel steering system.

FIG. 8 describes the determination of the wheel base 1 of a vehicle with a symmetrical allwheel steering system, that is, of a vehicle whose left front and rear wheels, when cornering, are each turned by a steering angle of the same amount. For determining the wheel base 1, rotational wheel speed sensors 12 and 13 are assigned to the front wheels 10 and 11. In addition, the steering angle sensor 24 is provided on the front wheel 10. For the distances R1 and R2 of the wheels 10 and 11 from the instantaneous center M of the vehicle, which in the case of a vehicle with a symmetrical allwheel control, is situated on the vertical center line 26 of the side member 3, for the speeds v2 and v4 of the wheels 10 and 11 as well as for the track width b of the vehicle, the following equations can be derived:

$$\frac{V_1}{V_2} = \frac{R_1}{R_2} \Rightarrow R_1 = \frac{V_1}{V_2} R_2;$$

$$R_1^2 = b^2 + R_2^2 - 2 \, b \, R_2 \cos\alpha;$$

$$l = 2 \, R_2 \sin\alpha;$$

A substitution results in a square equation for R2 and, from the latter, in the required wheel base l.

Figure 9:
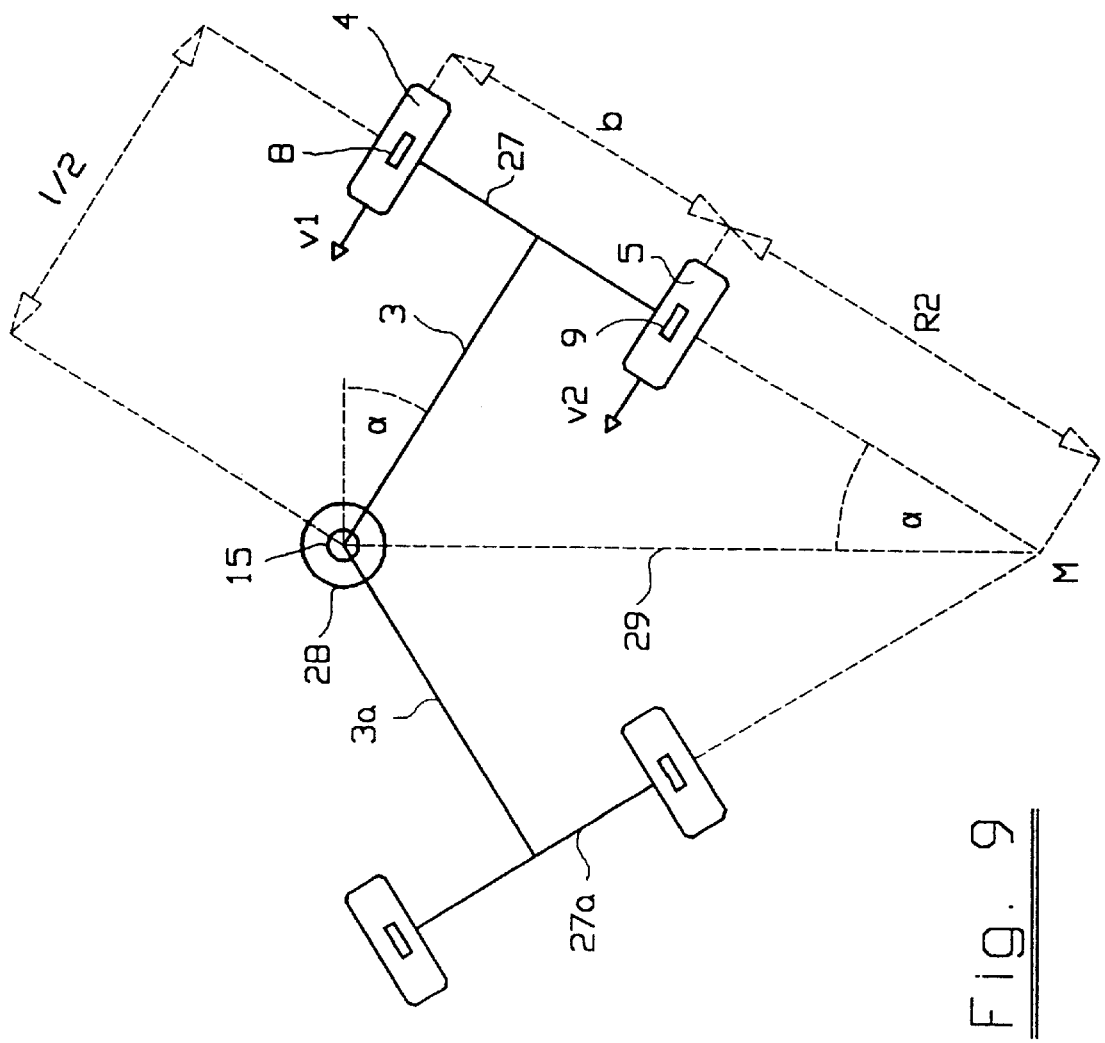
FIG. 9 is a view of a vehicle which is equipped with two rotational wheel speed sensors and one steering angle sensor and has an articulated frame steering system.

FIG. 9 describes the determination of the wheel base of a vehicle with a symmetrical articulated frame steering. The chassis of this vehicle consists of two symmetrical chassis elements which are connected with one another by a swivel joint 15. Each of the chassis elements consists of a side member 3 and 3a of the length l/2, which is equal to half the wheel base of the vehicle during straight-ahead driving. Axles 27 and 27a are fastened transversely on the side members 3 and 3a. The two wheels 4 and 5 with the assigned rotational wheel speed sensors 8 and 9 for determining the corresponding wheel circumference speeds v1 and v2 are arranged on the axle 27. In addition, a steering angle sensor 28 for determining the steering angle a of the side member 3 is provided on the swivel joint 15. The instantaneous center M of the vehicle is obtained from the intersection point of a bisecting line 29 of the two side members 3 and 3a as well as the imagined extension of the axles 27 and 27a. For the distance R2 of the wheel 5 situated on the inside during cornering from the instantaneous center M. the track width b and the speeds v1 and v2 of the wheels 4 and 5 as well as the steering angle α, the following equations for determining the wheel base l of the vehicle can be derived:

$$\frac{V_1}{V_2} = \frac{R_2 + b}{R_2};$$

$$\frac{l}{2} = \left(R_2 + \frac{b}{2}\right)\tan\alpha$$

$$l = b\left(\frac{2V_2}{V_1 - V_2} + 1\right)\tan\alpha;$$

Finally, it should be pointed out that FIGS. 1 to 9 did not explain all conceivable "sensor combinations" which are suitable for determining the wheel base. However, the basic principle of determining the wheel base from defined, possibly different track widths of a vehicle, measured wheel circumference speeds and/or measured steering angles and the position of the instantaneous center of the vehicle remains the same, and can also be applied to numerous other vehicles which were not explained explicitly.

Figure 10:
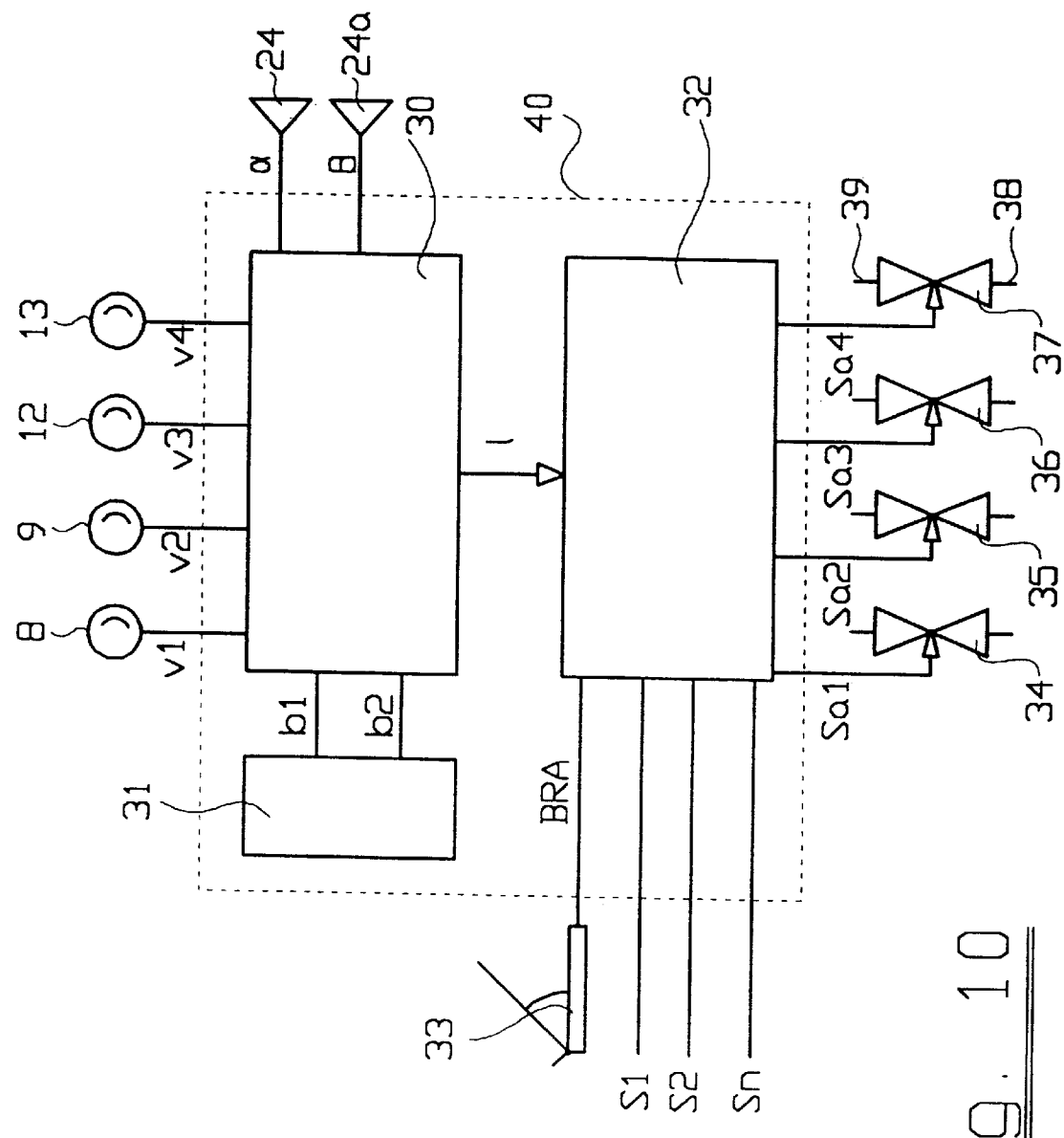
FIG. 10 is a schematic view of a device according to the invention.

FIG. 10 is a diagram of an arrangement according to the invention. The arrangement has a computer unit 30 and a storage unit 31 in which, in the embodiment illustrated here, two track widths b1 and b2 are stored and are supplied to the computer unit 30. In addition, four signals, which are supplied here by the rotational wheel speed sensors 8, 9, 12 and 13 and which correspond to the wheel circumference speeds v1, v2, v3 and v4, are supplied to the computer unit 30. In addition, signals, which are generated by the two steering angle sensors 24 and 24a and which correspond to the measured steering angles α and β of steered vehicles, are supplied to the computer unit 30. From some or from all of the track widths b1, b2, wheel circumference speeds v1–v4 and the steering angles α, β supplied to the computer unit 30, the computer unit generates a signal which corresponds to the wheel base l of the vehicle. In the embodiment illustrated here, more signals are supplied to the computer unit 30 than are required for determining the wheel base of the vehicle illustrated, for example, in FIG. 1, which permits a redundant wheel base determination. The computer unit 30 can therefore compare the wheel base signals with one another which are obtained from the different "signal groups" and can generate therefrom, for example by an arithmetical averaging, the wheel base signal l entered in FIG. 10.

In the embodiment illustrated here, the signal l representing the wheel base is supplied to a processing unit 32 which may, for example, be an automatic driving dynamics control system, an EBS system, and ABS system or a similar system. In addition, a braking demand signal BRA is supplied here to the processing unit 32, which is defined by the driver using the brake pedal 33. Additional signals Sl to Sn may be supplied to the processing unit 32, which represent, for example, the acceleration of the vehicle, the loading condition of the vehicle, the angle of slope of the road, etc. From the signals supplied to the processing unit, output signals Sa1, Sa2, Sa3 and Sa4 are generated which are used here in each case for controlling an assigned valve 34, 35, 36 and 37. The valves 34–37 may, for example, be ABS valves which are connected by lines 38 and 39 with a brake (not shown) of a vehicle or with a brake pressure generating unit (not shown).

As illustrated in FIG. 10, the arrangement according to the invention with the processing unit 32 can be integrated in a superimposed control or automatic control unit 40.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method for the automatic determination of the wheel base of steerable vehicles during cornering, the vehicles having sensors for measuring the wheel circumference speeds on at least two non-steered vehicle wheels and at least one steered vehicle wheel, wherein the method comprising:
   a) determining the wheel circumference speeds (v1–v4) at the at least three vehicle wheels,
   b) obtaining at least one track width of a vehicle axle,
   c) determining from the wheel circumference speeds and the at least one track width the wheel base.

2. A method according to claim 1, wherein the vehicle has sensors for measuring the wheel circumference speeds on two non-steered vehicle wheels of a first non-steered vehicle axle and two steered vehicle wheels of a second non-steered vehicle axle, wherein the median track widths of both vehicle axles have the same value, and wherein the wheel base of the vehicle is determined according to equation $$l = b \frac{\sqrt{1 - \left(\frac{V_1}{V_3}\right)^2} \sqrt{1 - \left(\frac{V_2}{V_4}\right)^2}}{\frac{V_1}{V_3}\sqrt{1 - \left(\frac{V_2}{V_4}\right)^2} - \frac{V_2}{V_4}\sqrt{1 - \left(\frac{V_1}{V_3}\right)^2}}$$

where v1 and v2 are the wheel circumference speeds of the non-steered wheels and V3 and V4 are the wheel circumference speeds of the steered wheels.

3. A method according to claim 1, wherein the vehicle has sensors for measuring the wheel circumference speeds on two non-steered vehicle wheels of a non-steered vehicle axle and on two vehicle wheels which are non-steered with respect to a steered vehicle axle, wherein the median track widths of both vehicle axles have the same value, and the wheel base of the vehicle is determined according to the equation $$l = b\sqrt{\left(\frac{V_4(V_3 - V_1)}{V_1 V_4 - V_2 V_3} + \frac{1}{2}\right)^2 - \left(\frac{V_2(V_3 - V_1)}{V_1 V_4 - V_2 V_3} + \frac{1}{2}\right)^2};$$

where v1 and v2 are the wheel circumference speeds of the non-steered wheels and V3 and v4 are the wheel circumference speeds of the wheels which are non-steered with respect to the steered vehicle axle.

4. A method according to claim 1, wherein the vehicle has sensors for measuring the wheel circumference speeds on two non-steered vehicle wheels of a first non-steered vehicle axle and on a steered vehicle wheel of a second non-steered vehicle axle, wherein the median track widths of both vehicle axles have the same value, and wherein the wheel base (L) of the vehicle is determined according to the equation $$l = b\frac{\sqrt{V_3^2 - V_1^2}}{(V_1 - V_2)^2};$$

where v1 and v2 are the wheel circumference speeds of the non-steered wheels and v3 is the wheel circumference speed of the steered wheel.

5. A method according to claim 1, the vehicle has sensors for measuring the wheel circumference speeds at two non-steered vehicle wheels of a first non-steered vehicle axle and one of two steered vehicle wheels of a second non-steered vehicle axle, wherein the median track width of the first vehicle axle has a value b1, and the median track width of the second vehicle axle has a value b2 which differs from b1, wherein the wheel base of the vehicle is determined according to the equation $$l = \sqrt{\left(\frac{V_3}{(V_1 - V_2)^2} b_1\right)^3 - \left(\frac{V_2}{V_1 - V_2} b_1 + \frac{b_1 + b_2}{2}\right)^2}$$

where v1 and v2 are the wheel circumference speeds of the non-steered wheels and v3 is the wheel circumference speed of the steered wheel which is on the outside during cornering, and wherein the wheel base of the vehicle is determined according to the equation $$l = \sqrt{\left(\frac{V_4}{V_1 - V_2} b_1\right)^3 - \left(\frac{V_2}{V_1 - V_2} b_1 + \frac{b_1 - b_2}{2}\right)^2}$$

where v1 and v2 are the wheel circumference speeds of the non-steered wheels and v4 is the wheel circumference speed of the steered wheel which is on the inside during the cornering.

6. A method for the automatic determination, when cornering, of the distance between an axle and a fifth wheel articulation of a semitrailer coupled by way of the fifth wheel articulation to the tractor vehicle, two non-steered vehicle wheels being arranged on the axle, one sensor respectively being assigned to each vehicle wheel for measuring the wheel circumference speeds of the vehicle wheels, the method comprising:
   a) determining the wheel circumference speeds of the vehicle wheels,
   b) obtaining a track width of the axle,
   c) obtaining a speed signal which corresponds to the speed of the fifth wheel articulation,
   d) determining the distance from the wheel circumference speeds, the speed signal and the track width.

7. A method for the automatic determination of the wheel base of steerable vehicles when cornering, the vehicles having sensors on at least two vehicle wheels for measuring the wheel circumference speeds and additionally having a sensor on at least one steered vehicle wheel for measuring a steering angle of the at least one steered vehicle wheel, the method comprising:
   a) determining the wheel circumference speeds of the at least two vehicle wheels,
   b) obtaining the steering angle of the at least one steered vehicle wheel,
   c) obtaining at least one track width of a vehicle axle,
   d) determining the wheel base from the wheel circumference speeds, the steering angle and the at least one track width.

8. A method according to claim 7, wherein one sensor respectively for measuring the wheel circumference speeds is assigned to a non-steered vehicle wheel and to a steered vehicle wheel, and the sensor for measuring the steering angle is also assigned to the one steered vehicle wheel.

9. A method according to claim 7, wherein one sensor respectively for measuring the wheel circumference speeds is assigned to two steered vehicle wheels, and the sensor for measuring the steering angle is also assigned to one of these two vehicle wheels.

10. A method for the automatic determination of the wheel base of a vehicle having an articulated frame steering, whose chassis consists of two chassis components which are connected with one another by a steering joint, each chassis component having an axle with two wheels respectively, one sensor respectively for measuring the wheel circumference speeds being assigned to two wheels of one of the two axles, and the vehicle having a steering angle sensor for measuring steering angles of the steering joint, the method comprising:

a) determining the wheel circumference speeds of the two vehicle wheels of one of the two axles, b) determining the steering angle of the steering joint, c) obtaining a track width of that vehicle axle is defined to whose wheels the sensors for measuring the wheel circumference speeds are assigned, d) determining the wheel base from the wheel circumference speeds, the steering angle and the track width.

11. A method for the automatic determination of the wheel base of steerable vehicles when cornering, the vehicles having two non-steered vehicle wheels and two steered vehicle wheels, one sensor respectively for measuring steering angles being assigned to the steered vehicle wheels, the method comprising:

a) determining the steering angles of the two steered vehicle wheels, b) obtaining at least one track width of a vehicle axle, c) determining the wheel base from the steering angles and the at least one track width.

12. A device for the automatic determination of the wheel base of steerable vehicles when cornering, and comprising:

a computer unit and a storage unit;

at least one value corresponding to the track width of a vehicle axle being stored in the storage unit, and this value representing the track width of one vehicle axle being an input to the computer unit;

signals from rotational wheel speed sensors and/or from steering angle sensors being inputs to the computer unit; and the computer unit generating and outputting a signal representing the wheel base of the vehicle from the input signals.

13. A device according claim 12, wherein the signal representing the wheel base is supplied to a processing unit which is an automatic driving dynamics control system, an ABS system, an EBS system or similar system.

14. A method according to claim 6, including generating the speed signal from at least one track width of a vehicle axle of the tractor vehicle, the position of the fifth wheel articulation with respect to wheels of the tractor vehicle as well as from signals which are supplied by rotational wheel speed sensors and/or steering angle sensors of the tractor vehicle.

* * * * *